United States Patent [19]
Araki et al.

[11] Patent Number: 5,257,675
[45] Date of Patent: Nov. 2, 1993

[54] JUXTAPOSED MOTOR VEHICLE ENGINE AND TRANSMISSION POWER TRANSMITTING APPARATUS WITH REDUCED AXIAL AND TRANVERSE DIMENSIONS

[75] Inventors: Junichi Araki; Tomokazu Takeda; Masahiro Imamura; Yorinori Kumagai, all of Saitama; Masayuki Tamura, Tokyo, all of Japan

[73] Assignee: Honda Giken Kogyo Kabushiki Kaisha, Tokyo, Japan

[21] Appl. No.: 908,867

[22] PCT Filed: Dec. 11, 1989

[86] PCT No.: PCT/JP89/01241
§ 371 Date: Dec. 20, 1990
§ 102(e) Date: Dec. 20, 1990

[87] PCT Pub. No.: WO91/08920
PCT Pub. Date: Jun. 27, 1991

Related U.S. Application Data

[63] Continuation of Ser. No. 632,046, Dec. 20, 1990, abandoned.

[51] Int. Cl.⁵ ............................................. B60K 17/04
[52] U.S. Cl. ..................................... 180/297; 475/66; 475/71; 475/200
[58] Field of Search ................. 180/233, 297, 337; 74/606 R; 475/66, 71, 200; 123/90.27, 90.31, 195 R

[56] References Cited

U.S. PATENT DOCUMENTS

| | | | |
|---|---|---|---|
| 3,017,787 | 1/1962 | Payne | 74/701 |
| 3,150,543 | 9/1964 | Dangauthier | 475/200 |
| 3,703,107 | 11/1972 | Piret | 74/606 R |
| 4,836,156 | 6/1989 | Inagaki et al. | 123/90.31 |
| 4,938,098 | 7/1990 | Sasaki et al. | 475/200 |
| 5,007,307 | 4/1991 | Tamazawa et al. | 74/606 R |

FOREIGN PATENT DOCUMENTS

| | | | |
|---|---|---|---|
| 1195515 | 11/1960 | France | 475/200 |
| 1422223 | 11/1965 | France | . |
| 55-60756 | 5/1980 | Japan | . |
| 58-42850 | 3/1983 | Japan | . |
| 62-49502 | 10/1987 | Japan | . |
| 316561 | 12/1989 | Japan | 475/200 |
| 76946 | 3/1990 | Japan | 475/200 |
| 976014 | 11/1964 | United Kingdom | 180/297 |
| 1084453 | 9/1967 | United Kingdom | . |
| 2179604 | 3/1987 | United Kingdom | . |

Primary Examiner—Mitchell J. Hill
Attorney, Agent, or Firm—Lyon & Lyon

[57] ABSTRACT

A power transmitting apparatus that includes an engine, a transmission disposed alongside of the engine in juxtaposed relation; and gears, a chain, a belt, or the like operatively coupling the output shaft of the engine and the input shaft of the transmission. The transmission comprises a countershaft-type transmission having, in addition to the input shaft, a countershaft and an output axis of rotation which extend parallel to the input shaft. The countershaft is disposed more closely to the engine than a plane which passes through the input shaft and the output axis of rotation of the transmission. Preferably, the output shaft of the engine and the input shaft of the transmission are operatively coupled with a resilient belt trained around a drive pulley coupled to the output shaft of the engine and a driven pulley coupled to the input shaft of the transmission.

5 Claims, 5 Drawing Sheets

JUXTAPOSED MOTOR VEHICLE ENGINE AND TRANSMISSION POWER TRANSMITTING APPARATUS WITH REDUCED AXIAL AND TRANVERSE DIMENSIONS

CROSS REFERENCE TO RELATED APPLICATIONS

This is a continuation of application Ser. No. 07/632,046, filed Dec. 20, 1990, now abandoned.

TECHNICAL FIELD

The present invention relates to a power transmitting apparatus for driving a motor vehicle or the like, and more particularly to a power transmitting apparatus which comprises an engine and a transmission that are juxtaposed with respect to each other.

BACKGROUND ART

Generally, a power transmitting apparatus for use in a motor vehicle comprises an engine, a coupling means (such as a clutch, a fluid coupling, a torque converter or the like) connected to the output shaft of the engine, and a transmission for changing the speed of the engine output a power that is transmitted through the coupling means. The output power from the transmission is then transmitted through a differential mechanism or the like to road wheels for thereby driving the motor vehicle.

Heretofore, it has been customary that the engine, the coupling means, and the transmission are arranged in an axial row, and the power transmitting apparatus of such a construction is disposed in a front engine compartment of the motor vehicle. With this arrangement, however, the dimension from the front end of the engine to the rear end of the transmission is so large that if the engine is directed longitudinally with respect to the motor vehicle, the rear portion of the transmission will project into the passenger compartment, thus reducing the space in the passenger compartment, and if the engine is directed transversely with respect to the motor vehicle, the engine compartment will have an increased dimension in this transverse direction. Therefore, the axial dimensions of the engine and the transmission are limited in many instances, making it difficult to install a multi-cylinder engine, for example, in the motor vehicle.

There have been efforts to solve the above problems as disclosed in Japanese Laid-Open Patent Publication Nos. 55(1980)-60756 and 58(1983)-42850, for example. According to the disclosed power transmitting apparatus, a transmission is disposed alongside of an engine in juxtaposed relation, and the output shaft of the engine and the input shaft of the transmission are operatively coupled to each other by a chain mechanism. The power transmission apparatus with the engine and the transmission thus united together has a reduced axial dimension.

DISCLOSURE OF THE INVENTION

When the transmission is disposed alongside of the engine, as described above, the axial dimension of the power transmission apparatus is reduced. However, the transverse dimension of the power transmitting apparatus is increased by the width of the transmission. Particularly if the transmission is a countershaft-type transmission, since gear trains and clutches are disposed between parallel shafts in the transmission, the shafts are required to be spaced a certain distance from each other, and hence the transmission has a large transverse dimension. Consequently, a power transmitting apparatus in which a countershaft-type transmission is positioned alongside of an engine is more likely to have an increased transverse dimension.

The present invention has been made in view of the aforesaid drawbacks.

It is an object of the present invention to provide a power transmitting apparatus which includes a transmission disposed alongside of an engine and hence has a reduced axial dimension, and which also holds any increase in the transverse dimension to a minimum.

To achieve the above object, there is provided in accordance with the present invention, a power transmitting apparatus comprising an engine, the engine having an output shaft, a transmission disposed alongside of the engine in juxtaposed relation, the transmission having an input shaft substantially parallel to the output shaft of the engine, and transmitting means operatively coupling the output shaft of the engine and the input shaft of the transmission, characterized in that the transmission comprises a countershaft-type transmission having, in addition to the input shaft, a countershaft and an output axis of rotation which extend parallel to the input shaft, the countershaft being disposed more closely to the engine than a plane which passes through the input shaft and the output axis of rotation of the transmission.

Preferably, the transmitting means comprises a drive pulley coupled to the output shaft of the engine, a driven pulley coupled to the input shaft of the transmission, and a resilient belt trained around the drive and driven pulleys.

With the above arrangement, since the countershaft of the transmission is positioned close to the engine, the amount of lateral projection of the transmission is reduced, and any increase in the transverse dimension (i.e., the dimension perpendicular to the shafts) of the overall power transmitting apparatus is minimized.

The transmitting means may be in the form of a train of gears, a chain, a belt, or the like. However, a gear train is inadequate because the distance between the engine output shaft and the transmission input shaft is large. Use of the chain is problematic for the following reasons. First, since the chain itself is heavy, the weight of the apparatus as a whole is increased. Second, the inertia of the components on the input side of the transmission is so large that if the transmission is an automatic transmission, it tends to produce gearshift shocks when changing the speeds, and if the transmission is a manual transmission, the synchronizing capability of the synchromesh mechanisms is lowered. Another problem is that any loss of transmitted power is large as the power transmission efficiency of the chain is not sufficiently high. Inasmuch as it is difficult to completely eliminate play between the chain and the sprockets, and the chain and the sprockets are made of a rigid material such as steel or the like, the chain. The rotational speed is also likely to vary on account of the play between the chain in apt to be noisy and the sprockets. Especially if the manual transmission is employed, the synchromesh mechanisms tend to produce gear tooth noise (rattling sound) due to fluctuations in the rotational speed of the idling engine when the transmission is in a neutral gear position. Any fluctuations in the engine rotational speed are amplified by the play, thus increasing the gear tooth noise (rattling sound). In view of the above drawbacks, it is most preferable that the transmitting means be a resilient belt.

BEST MODE FOR CARRYING OUT THE INVENTION

Preferred embodiments of the present invention will hereinafter be described with reference to the drawings.

Figure 1:
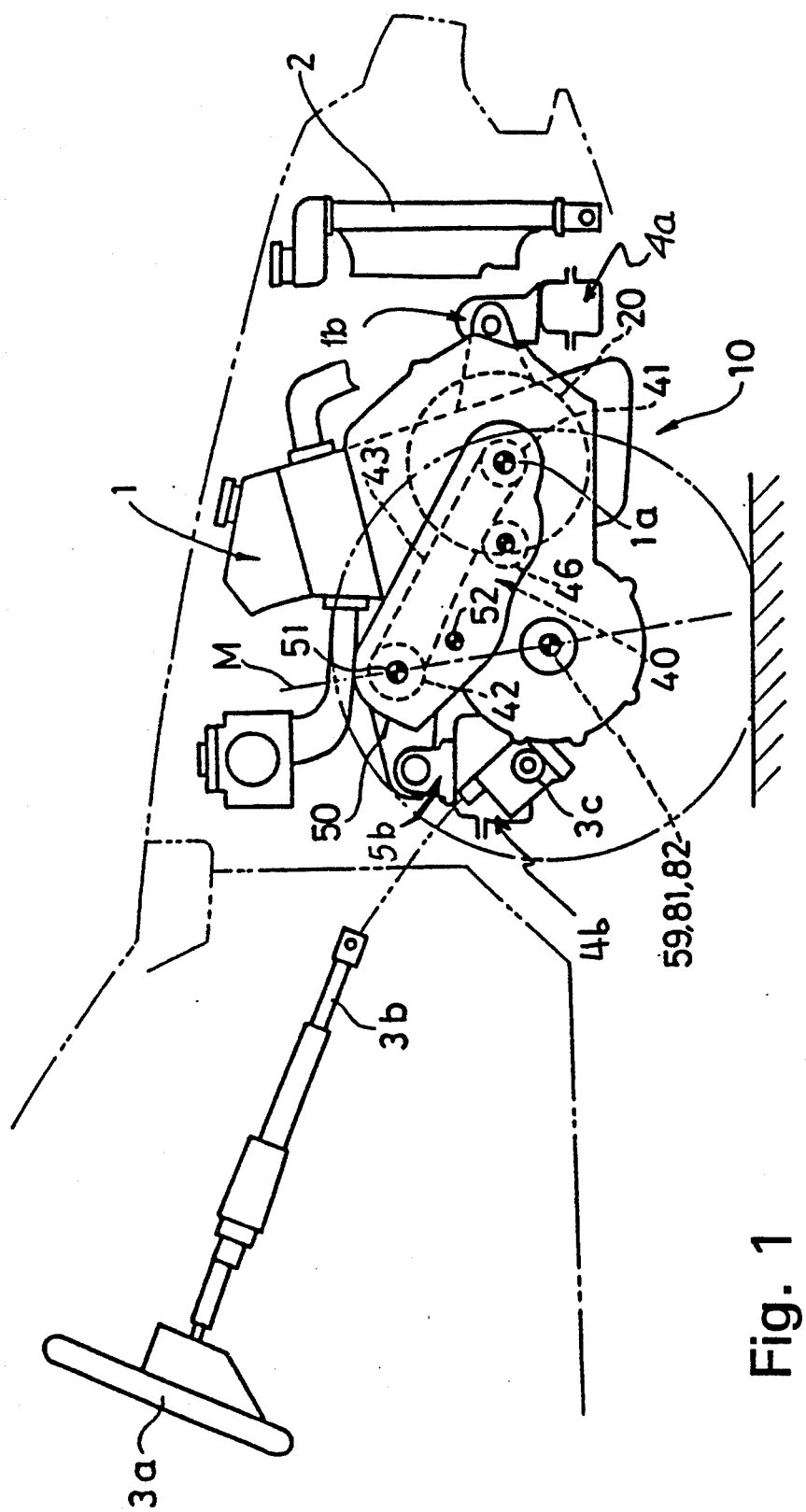
FIGS. 1 and 2 are schematic side elevational and plan views, respectively, of a front portion of a motor vehicle which has a power transmitting apparatus according to the present invention.
Figure 2:
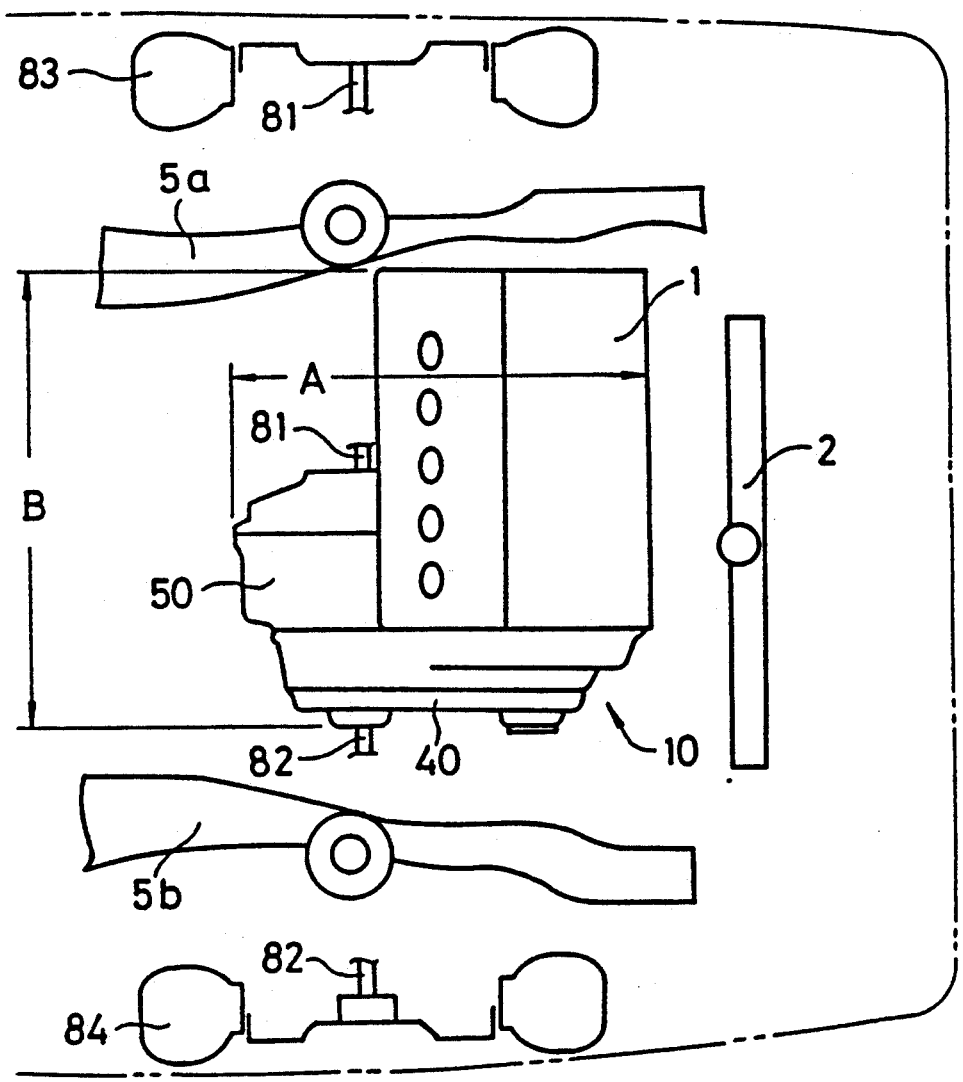

FIGS. 1 and 2 are schematic side elevational and plan views, respectively, of a front portion of a motor vehicle which has a power transmitting apparatus according to the present invention. An engine 1 and a power transmitting apparatus 10 integrally united therewith are disposed in an engine compartment defined in the front portion of the motor vehicle.

The engine 1 has a crankshaft disposed rearwardly of a radiator 2 and extending transversely of the motor vehicle, and cylinders whose axes extend upwardly in the rearward direction. The power transmitting apparatus 10 is integrally coupled to the end of the engine 1 where its output shaft projects. The power transmitting apparatus 10 has a main clutch 20 coupled coaxially to the engine output shaft 1a, and a transmission 50 disposed rearwardly alongside of the engine 1. The main clutch 20 has an output shaft 27 (coaxial with the engine output shaft 1a) operatively coupled to an input shaft 51 of the transmission 50 by a belt means 40 which comprises a drive pulley 41 mounted on the main clutch output shaft 27 a driven pulley 42 mounted on the transmission input shaft 51, a tensioner 46, and a rubber belt 43 trained around the pulleys 41, 42. The detailed structure of the power transmitting apparatus 10 will be described later on.

Figure 3:
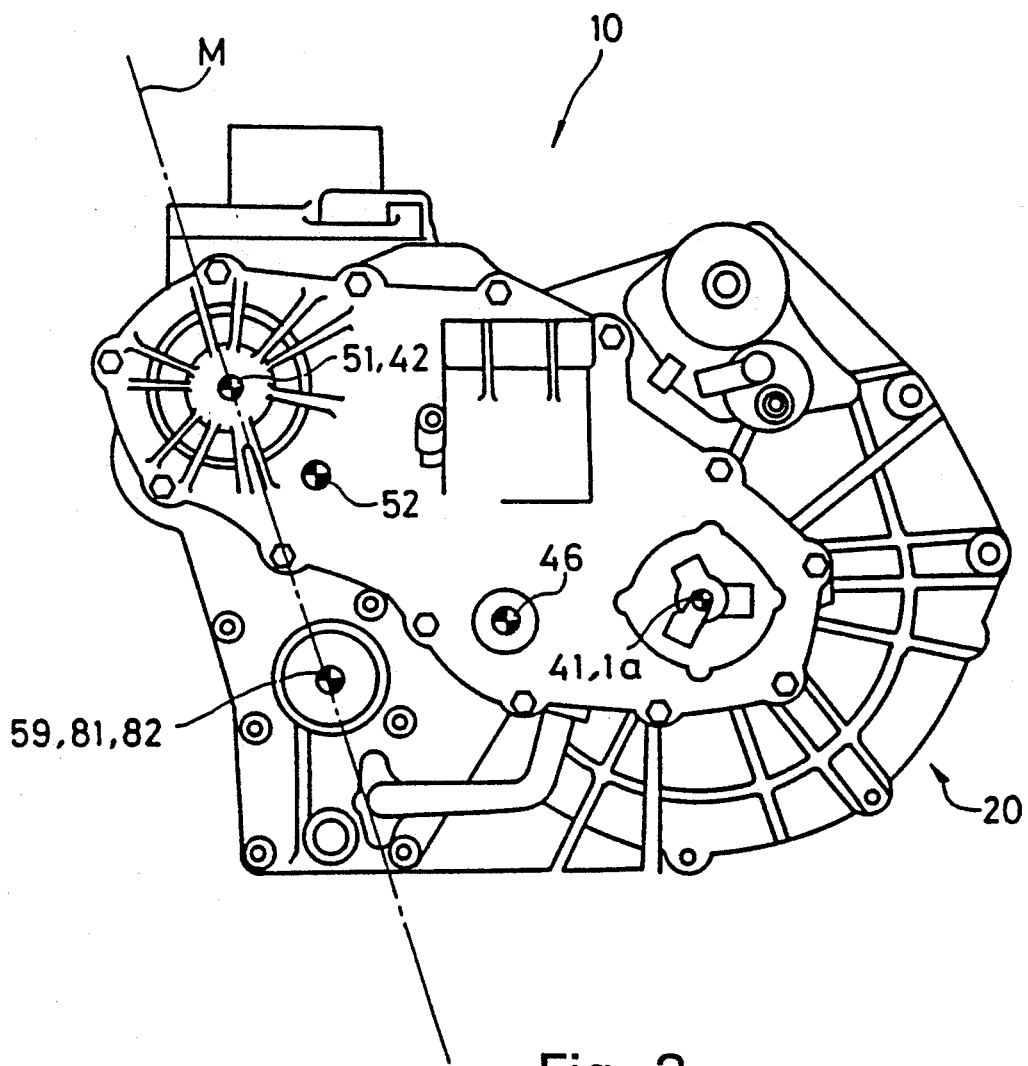
FIG. 3 is a side elevational view of a power transmitting apparatus.

The power transmitting apparatus 10 is shown in detailed side elevation in FIG. 3. As shown in FIGS. 3 and 1, the output shaft of the clutch 20 and the rotatable shaft of the drive pulley 41 mounted thereon are coaxial with the output shaft 1a of the engine 1. The input shaft 51 of the transmission 50 on which the driven pulley 42 is mounted is positioned rearwardly and slightly upwardly of the engine output shaft 1a, as shown in FIG. 1. The transmission 50 includes a countershaft 52 positioned obliquely forwardly and downwardly of the transmission input shaft 51. The input shaft 51 and the countershaft 52 extending in the transverse direction of the motor vehicle. The countershaft 52 is operatively coupled through the final gears 67, 71 to a differential mechanism 70 which is disposed therebelow and produces an output axis of rotation 59 of the power transmitting apparatus 10. The differential mechanism 70 has left and right axle shafts 81, 82 coupled respectively to left and right front road wheels 83, 84. The center of rotation of the differential mechanism 70 and the center of rotation of the axle shafts 81, 82 are aligned with the center of the output axis of rotation 59, and positioned substantially vertically below the countershaft 52.

As illustrated in FIGS. 1 and 3, the countershaft 52 is positioned ahead of a plane in which passes through the input shaft 51 and the output axis of rotation 59, i.e., on the side of the plane m that is near the engine. With this arrangement, the amount by which the transmission 50 projects rearwardly (leftwardly as shown) is reduced, and the transverse dimension A (see FIG. 2) of the power transmitting apparatus 10 including the engine 1 is held to a minimum.

The left and right front road wheels 83, 84 are operatively coupled to a steering gearbox 3c through tie rods (not shown). Turning movement of a steering wheel 3a is transmitted through a steering shaft 3b to the steering gearbox 3c to steer the left and right front road wheels 83, 84.

The engine 1 and the power transmitting apparatus 10 integrally united therewith are mounted on and supported by transverse frames 4a, 4b through a bracket 1b attached to the engine 1 and a bracket 1c attached to the transmission 50. The transverse frames 4a, 4b are positioned forwardly and rearwardly of the engine 1 and the power transmitting apparatus 10, respectively, and extend transversely of the motor vehicle.

Since the transmission 50 is disposed rearwardly alongside of the engine 1 and parallel to the crankshaft thereof, and also since the transmission 50 and the engine 1 are operatively connected to each other by the belt means 40, the axial dimension (indicated by B in FIG. 2) of the engine 1 and the power transmission 50 which are integrally united together is reduced. Therefore, the space of the engine compartment in the transverse direction of the motor vehicle may be small. If the space in the engine compartment remains the same, then a multicylinder engine having a large axial dimension may be installed in the engine compartment, and longitudinal frames 5a, 5b extending longitudinally of the motor vehicle on both sides of the engine compartment may be increased in width for greater mechanical strength.

Figure 4:
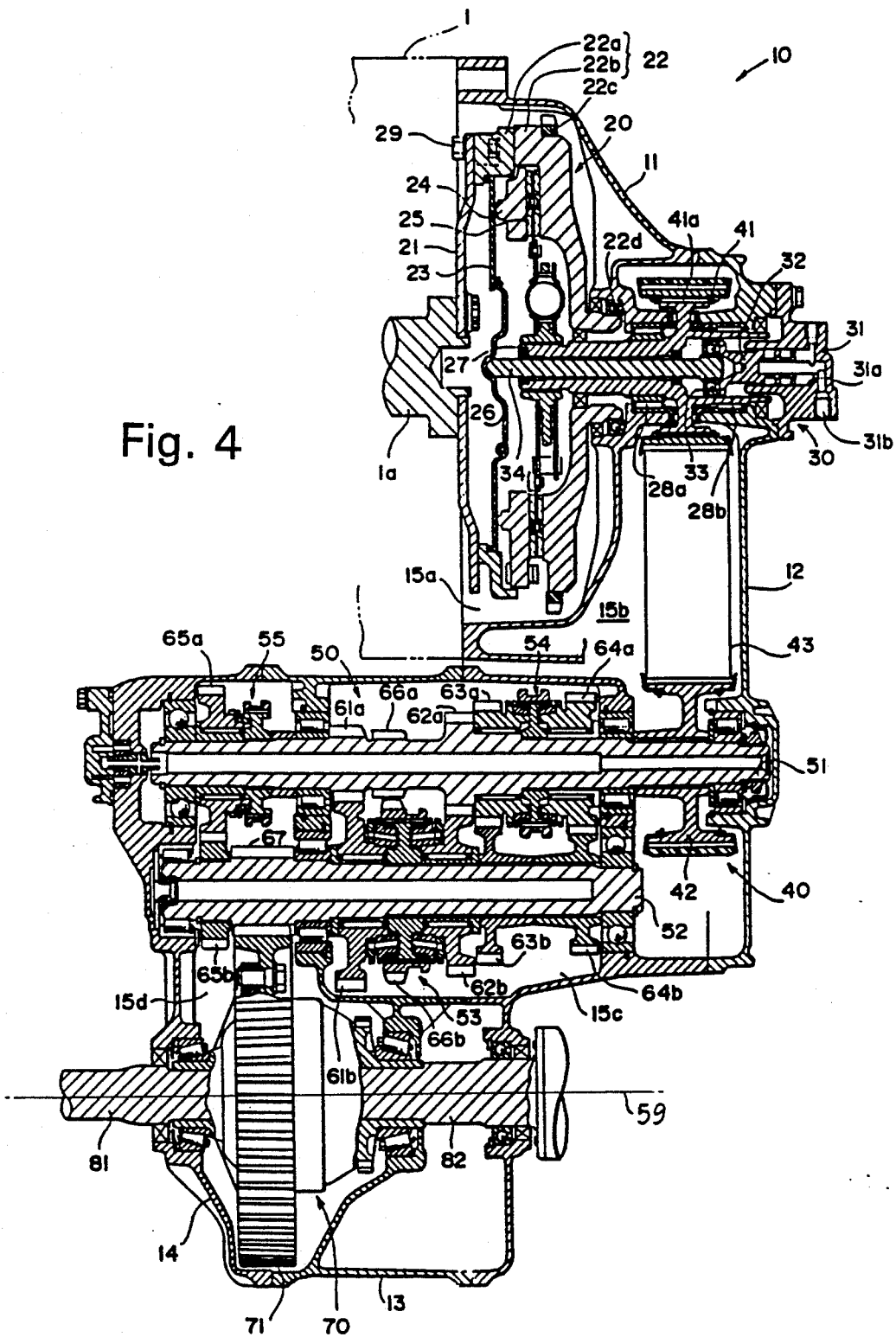
FIG. 4 is a detailed cross-sectional view of the power transmitting apparatus which incorporates a manual transmission.

The power transmitting apparatus 10 will hereinafter be described in detail with reference to FIG. 4. As described above, the power transmitting apparatus 10 is integrally joined to the engine 1 at the output end thereof. The power transmitting apparatus 10 has left and right housings 13, 11 and left and right covers 14, 12 which jointly define spaces 15a through 15d, and also includes the main clutch 20 serving as a coupling means, a clutch release unit 30 for operating the main clutch 20, the belt means 40 in the form of a toothed rubber belt, the transmission 50 of the countershaft type, and a differential mechanism 70. The main clutch 20, the clutch release unit 30, the belt means 40, the transmission 50, and the differential mechanism 70 are disposed in the spaces 15a through 15d.

The main clutch 20 is disposed in the space 15a which is surrounded by the right housing 11 and an output end face of an engine case. The main clutch 20 comprises a single-dry-plate, diaphragm-spring clutch for selectively transmitting the engine output power from the engine output shaft 1a.

The main clutch 20 has a drive plate 21 joined to the engine output shaft 1a, a spring-supporting disc 22a joined to the outer peripheral edge of the drive plate 21, and a flywheel disc 22b coupled to the disc 22a. The discs 22a, 22b jointly constitute the flywheel 22. The drive plate 21 and the flywheel 22 define a space therebetween in which there are disposed a diaphragm spring 23, a pressure disc 24, and a friction disc 25. A ring gear 22c is fixed to the outer peripheral surface of the flywheel disc 22b, which is rotatably supported at its righthand end in the right housing 11 by a ball bearing 22d.

The friction disc 25 has an inner peripheral portion splined to the output shaft 27 of the main clutch 20. A friction member mounted on the outer periphery of the friction disc 25 is sandwiched between the flywheel disc 22b and the pressure disc 24. The diaphragm spring 23 has an outer peripheral edge supported by the spring-supporting disc 22a, for normally urging the pressure disc 24 toward the friction disc 25 to couple the friction disc 25 to the flywheel disc 22b. With the friction disc 25 coupled to the flywheel disc 22b, the engine output power is directly transmitted to the main clutch output shaft 27.

The clutch release unit 30 serves to selectively release the friction disc 25 from the diaphragm spring 23 to cut off the transmission of the engine output power to the main clutch output shaft 27. The clutch release unit 30 comprises a slave cylinder 31 mounted on the right cover 12, a piston 32 axially slidably fitted in a cylinder hole 31a defined in the slave cylinder 31, and a rod 34 extending coaxially through the main clutch output shaft 27 and rotatable with respect to the main clutch output shaft 27.

The rod 34 has a ball bearing 33 on its righthand end. The ball bearing 33 has a righthand side which confronts and is held against the lefthand end of the piston 32. When the piston 32 is axially moved by a clutch pressure that is supplied from an oil pressure supply port 31b of the slave cylinder 31, the axial movement of the piston 32 is transmitted through the ball bearing 33 to the rod 34, which is similarly axially moved. The rod 34 has a lefthand end held against the central side surface of a release plate 26 attached to the inner peripheral edge of the diaphragm spring 23. When the rod 34 is axially moved to the left, it causes the release plate 26 to push the inner peripheral edge of the diaphragm spring 23, axially to the left.

The friction disc 25 is now released from the diaphragm spring 23, so that the main clutch 20 is disengaged and the engine output power is no longer transmitted to the main clutch output shaft 27. Therefore, the engagement and disengagement of the main clutch 20 can be controlled when the clutch pressure is supplied to and discharged from the hydraulic pressure supply port 31b of the slave cylinder 31.

The main clutch output shaft 27 is rotatably supported by a roller bearing 28a mounted in the right housing 11 and a roller bearing 28b mounted in the right cover 12. The drive pulley 41 is mounted on and coupled to the output shaft 27 by splines 41a. The driven pulley 42 has a rotatable shaft extending parallel to and spaced from the rotatable shaft of the drive pulley 41 (and the main clutch output shaft 27). The rubber belt 43 is trained around the pulleys 41, 42, thus making up the belt means 40. The rubber belt 43 is a toothed belt having teeth on its inner surface. The pulleys 41, 42 have on their outer peripheral surfaces outer teeth meshing with the teeth of the belt 43, for slipless, highly efficient power transmission. The belt means 40 is disposed in the space 15b which is surrounded by the right housing 11 and the right cover 12.

The rotatable shaft of the driven pulley 42 is aligned with the input shaft 51 of the transmission 50, i.e., the driven pulley 42 is mounted on the transmission input shaft 51.

The transmission 50 comprises a countershaft-type, manually operated transmission which is disposed in the spaces 15c, 15d surrounded by the left and right housings 13, 12 and the left cover 14. The transmission 50 has the input shaft 51 and a countershaft 52 extending parallel to the input shaft 51. The transmission 50 also has six gear trains, i.e., a train of intermeshing first-speed gears 61a, 61b, a train of intermeshing second-speed gears 62a, 62b, a train of intermeshing third-speed gears 63a, 63b, a train of intermeshing fourth-speed gears 64a, 64b, a train of intermeshing fifth-speed gears 65a, 65b, and a train of intermeshing meshing reverse gears 66a, 66b (the reverse gears 66a, 66b meshing with each other through an idler gear therebetween). One of the first- through fourth-speed gear trains is selected by synchromesh mechanisms 53, 54, 55 on the shafts 51, 52 to effect power transmission in a corresponding gear position. The reverse gear position is selected when the idler gear is axially slid into mesh with the gears 66a, 66b.

The countershaft 52 has a final drive gear 67 which is in mesh with a final driven gear 71 (the transmission output member) on the outer periphery of the differential mechanism 70 on the transmission output of rotation axis 59 which, in the preferred embodiment, coincides with the axes of axle shafts 81, 82. The engine output power, with its speed changed by a selecting one of the gear trains, is transmitted through the final gears 67, 71 to the differential mechanism 70, which distributes the engine output power to the left and right axle shafts 81, 82 from which it is transmitted to the left and right road wheels 83, 84.

In the power transmitting apparatus of the foregoing construction, the belt means 40 serves as a power transmitting means between the main clutch output shaft 27 and the transmission input shaft 51 which are positioned in a spaced-apart relationship from each other. However, if the sizes of the pulleys 41, 42 are suitably selected, the belt means 40 also serves as a primary reduction device for reducing the speed of the engine output power at a certain ratio and transmitting the engine output power to the transmission 50. Since the speed reduction ratio of the primary reduction device can be selected in order to apply an appropriate input power to the transmission in view of the capacity of the transmission with respect to the engine output power, the engine and the transmission can be selected with greater freedom.

The toothed rubber belt employed in the primary reduction device offers the following advantages over a primary reduction device which employs a chain or gears:

1) Since the transmission efficiency of the belt is higher than that of the chain, any loss of the output power of the engine is reduced. With a primary reduction device employing gears, many gears must be used if the distance between the input and output shafts of the primary reduction device is large, and the transmission efficiency is lowered. Use of the belt is, however, free of the problem of reduced transmission efficiency.

2) The belt is light in weight as it is made of rubber. The pulleys may be made of light-weight aluminum or the like. Therefore, the belt means as a whole may be reduced in weight, and the engine apparatus may be reduced in weight. Since the rotating mass of the belt means is small, the inertia of the components on the input side of the transmission is reduced. Therefore, if an automatic transmission is employed, the transmission can easily be controlled, and if a manual transmission is employed, the synchronizing capability of the synchromesh mechanisms is increased. The small rotating mass allows the primary reduction device to be used with a high-speed rotation engine.

3) Inasmuch as the noise of the primary reduction device is of a low level, the power transmitting apparatus and the motor vehicle incorporating the same may be made silent easily.

4) The belt which is made of a resilient material such as rubber or the like can transmit the rotation of the engine to the transmission while absorbing fluctuations of the rotational speed to some extent. Therefore, the belt can suppress gear tooth noise (rattling sound) which would otherwise be produced by engine rotational speed fluctuations when a manual transmission is in a neutral gear position.

Figure 5:
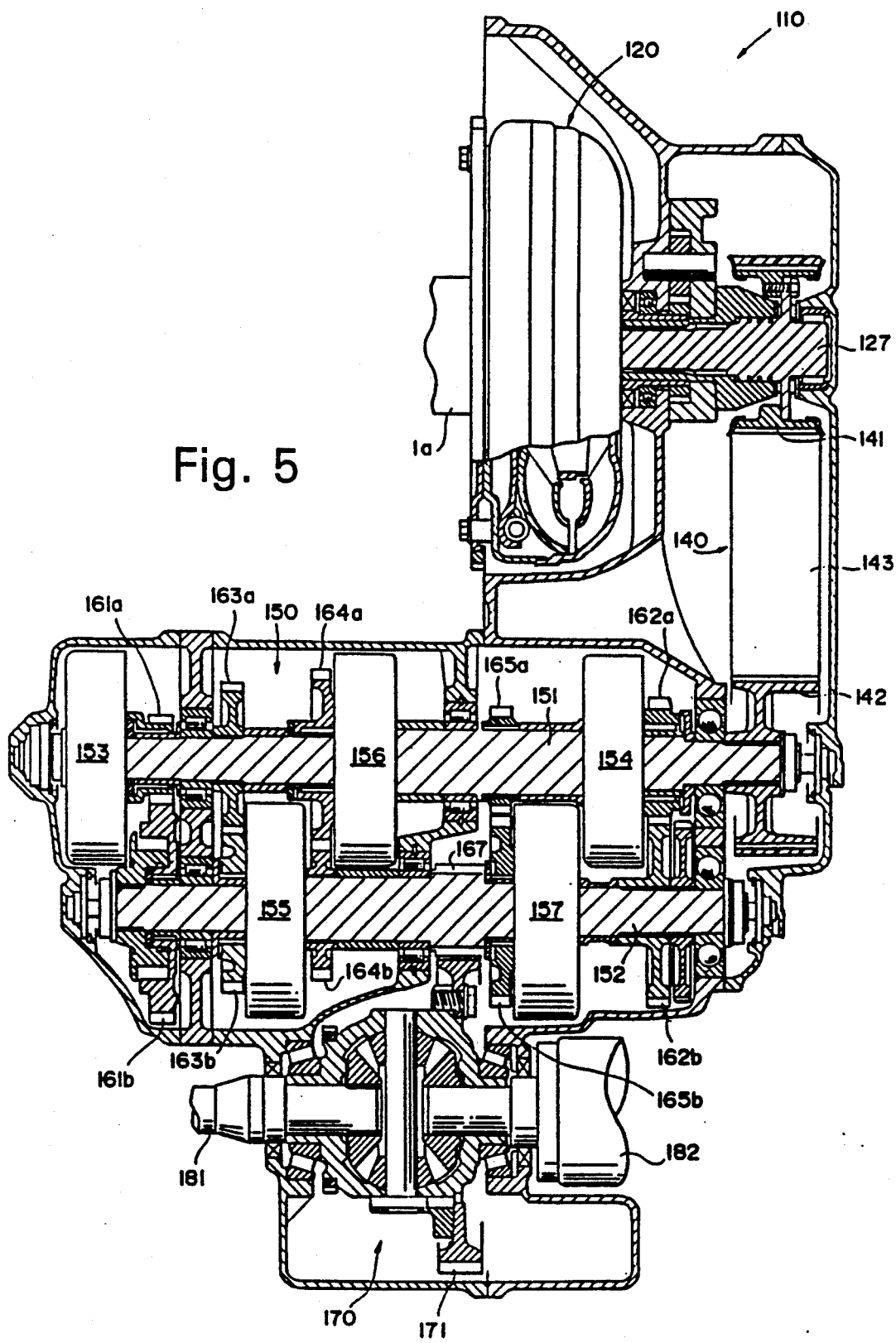
FIG. 5 is a detailed cross-sectional view of the power transmitting apparatus which incorporates an automatic transmission.

In the above embodiment, the manual transmission is employed. FIG. 5 shows a power transmitting apparatus 110 according to the present invention, in which an automatic transmission is incorporated.

As shown in FIG. 5, a torque converter 120 is coupled to the output shaft 1a of the engine 1, and has an output shaft 127 on which a drive pulley 141 is mounted. An automatic transmission 150 is positioned alongside of the engine 1 such that an input shaft 151 and a countershaft 152 extend parallel to the output shaft 1a of the engine 1. The input shaft 151 lies parallel to and is spaced a certain distance from the output shaft 127 of the torque converter 120. A rubber belt 143 is trained around the drive pulley 141 and a driven pulley 142 which is mounted on the input shaft 151, thereby making up the belt means 140.

The transmission 150 has five gear trains, i.e., a train of intermeshing first-speed gears 161a, 161b, a train of intermeshing second-speed gears 162a, 162b, a train of intermeshing third-speed gears 163a, 163b, a train of intermeshing fourth-speed gears 164a, 164b, and a train of intermeshing reverse gears 165a, 165b (the reverse gears 165a, 165b meshing with each other through an idler gear therebetween). One of these gear trains is selected by hydraulic clutches 153, 154, 155, 156, 157 mounted on the shafts 151, 152 to effect power transmission in a corresponding gear position.

The countershaft 152 has a final drive gear 167 which is in mesh with a final driven gear 171 (the transmission output member) on the outer periphery of a differential mechanism 170. The engine output power, with its speed changed by a selected one of the gear trains, is transmitted through the final gears 167, 171 to the differential mechanism 170, which distributes the engine output power to left and right axle shafts 181, 182 from which it is transmitted to the left and right road wheels 83, 84.

The belt means 140 employed as a primary reduction device for reducing the speed of the engine output power from the torque converter 120 to the input shaft 151 of the automatic transmission 150 is effective to increase the transmission efficiency, suppress noise, and reduce the weight of the apparatus, as with the belt means in the manual transmission. In addition, since the inertia of the components on the input side of the automatic transmission 150 is small, the transmission can easily be controlled for changing the gear positions, and gearshift shocks can easily be prevented from occurring.

In the above embodiments, the coupling means (the main clutch 20 or the torque converter 120) is disposed between the engine output shaft and the drive pulley of the belt means. However, the coupling means may be disposed between the driven pulley and the transmission input shaft.

In the power transmission apparatus of the present invention, as described above, the transmission is disposed alongside of the engine in juxtaposed relation, and the transmission comprises a countershaft-type transmission which has an input shaft, a countershaft, and an output shaft axis of rotation that are disposed parallel to each other, the countershaft being positioned more closely to the engine than a plane which passes through the transmission input shaft and the output axis of rotation. Therefore, the axial dimension of the overall power transmitting apparatus is reduced, and the transverse dimension thereof is held to a minimum. The power transmitting apparatus is thus rendered small and compact.

We claim:

1. A power transmitting apparatus comprising an engine having an engine output shaft, a transmission disposed alongside of said engine in juxtaposed relation, said transmission having a transmission input shaft substantially parallel to said engine output shaft and being disposed above said engine output shaft, and transmitting means operatively coupling said engine output shaft and said transmission input shaft, characterized in that said transmission comprises a countershaft-type transmission having, in addition to said transmission input shaft, a transmission countershaft and a transmission output member, said transmission countershaft and said transmission output member each having an axis of rotation extending parallel to an axis of rotation of said transmission input shaft, said axis of rotation of said transmission countershaft being disposed more closely to said engine than a plane which passes through said axis of rotation of said transmission input shaft and said axis of rotation of said transmission output member, and a plurality of trains of intermeshing transmission gears being disposed between said transmission input shaft and said transmission countershaft, and transmitting means comprising a drive pulley coupled to said engine output shaft, a driven pulley coupled to said transmission input shaft, and a resilient belt trained around said drive and driven pulleys.

2. A power transmitting apparatus according to claim 1, wherein said transmission comprises a manual transmission, further including a clutch disposed between said engine output shaft and said drive pulley, for selectively transmitting power from said engine output shaft to said drive pulley.

3. A power transmitting apparatus according to claim 1, wherein said transmission comprises an automatic transmission, further including a torque converter disposed between said engine output shaft and said drive pulley.

4. A power transmitting apparatus according to claim 1, wherein said engine is disposed in a front portion of a motor vehicle and has a crankshaft extending transversely with respect to a normal travel direction of the motor vehicle, said transmission being disposed rearwardly alongside of said engine, said axes of rotation of said transmission input shaft, said transmission countershaft, and said transmission output member extending parallel to said crankshaft, said axis of rotation of said transmission countershaft being disposed more closely to said engine than said plane.

5. A power transmitting apparatus according to claim 1, wherein said transmission output member comprises a final driven gear which meshes with a final drive gear mounted on said transmission countershaft.

* * * * *